(12) United States Patent
Wang et al.

(10) Patent No.: US 11,016,788 B2
(45) Date of Patent: May 25, 2021

(54) APPLICATION LAUNCHING METHOD AND DISPLAY DEVICE

(71) Applicant: HISENSE VISUAL TECHNOLOGY CO., LTD., Shandong (CN)

(72) Inventors: Dayong Wang, Shandong (CN); Guanghai Zhuang, Shandong (CN); Jianye Hei, Shandong (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 16/692,519

(22) Filed: Nov. 22, 2019

(65) Prior Publication Data

US 2020/0167173 A1 May 28, 2020

Related U.S. Application Data

(63) Continuation of application No. PCT/CN2019/115225, filed on Nov. 4, 2019.

(30) Foreign Application Priority Data

Nov. 28, 2018 (CN) .......................... 201811434034.6
Nov. 28, 2018 (CN) .......................... 201811435449.5

(51) Int. Cl.
*G06F 9/445* (2018.01)
*H04N 5/45* (2011.01)
(Continued)

(52) U.S. Cl.
CPC ...... *G06F 9/44505* (2013.01); *G06F 3/04817* (2013.01); *G06F 9/451* (2018.02);
(Continued)

(58) Field of Classification Search
CPC .. G06F 9/44505; G06F 3/04817; G06F 9/451; H04N 5/44591; H04N 5/45;
(Continued)

(56) References Cited

U.S. PATENT DOCUMENTS 5,467,144 A * 11/1995 Saeger ..................... H04N 5/45
348/566
5,614,957 A * 3/1997 Boyce ....................... G06T 3/40
348/567
(Continued)

FOREIGN PATENT DOCUMENTS

CN 104598109 A * 5/2015
CN 104598109 A 5/2015
(Continued)

OTHER PUBLICATIONS

ISA State Intellectual Property Office of the People's Republic of China, International Search Report Issued in Application No. PCT/CN2019/115225, dated Jan. 23, 2020, WIPO, 4 pages.

*Primary Examiner* — Kieu D Vu
*Assistant Examiner* — Alvaro R Calderon, IV
(74) *Attorney, Agent, or Firm* — Brinks Gilson & Lione (57) ABSTRACT

A method for launching an application of a display device is provided. A first user interface comprising at least one icon for an application is displayed on a display screen of the display device. It is determined whether a hold duration of a focus on a target icon exceeds a preset time period, the target icon is an icon of a target application. In response to the hold duration exceeding the preset time period, the first user interface is updated by a second user interface comprising a display window superimposed on the first user interface, the display window presents a display interface of the target application. It is determined whether an activation instruction for the target icon is received. In response to the activation instruction, the second user interface is updated by a third user interface that is a display interface displaying the target application in a full-screen mode.

15 Claims, 9 Drawing Sheets

(51) Int. Cl.
*G06F 3/0481* (2013.01)
*G06F 9/451* (2018.01)
*H04N 21/47* (2011.01)
*H04N 21/431* (2011.01)
*H04N 21/422* (2011.01)
*H04N 21/478* (2011.01)
*H04N 21/462* (2011.01)

(52) U.S. Cl.
CPC ......... *H04N 5/45* (2013.01); *H04N 21/42204* (2013.01); *H04N 21/4316* (2013.01); *H04N 21/47* (2013.01); *H04N 21/4622* (2013.01); *H04N 21/478* (2013.01)

(58) Field of Classification Search
CPC ....... H04N 5/4403; H04N 2005/44578; H04N 21/47; H04N 21/4316; H04N 21/42204; H04N 21/478; H04N 21/4622; H04N 21/4312; H04N 21/42215; H04N 21/485
See application file for complete search history.

(56) References Cited

U.S. PATENT DOCUMENTS

| | | | | |
|---|---|---|---|---|
| 5,734,415 A * | 3/1998 | Hwang | .................. | H04N 7/147 348/14.01 |
| 5,754,253 A * | 5/1998 | Lee | .......................... | H04N 5/45 348/565 |
| 5,808,659 A * | 9/1998 | Coutinho | ................. | H04N 5/45 348/567 |
| 5,847,771 A * | 12/1998 | Cloutier | ................... | H04N 5/45 348/564 |
| 5,943,050 A * | 8/1999 | Bullock | .............. | H04N 5/23293 348/211.8 |
| 6,115,080 A * | 9/2000 | Reitmeier | ............ | H04N 5/4401 348/564 |
| 6,329,998 B1 * | 12/2001 | Han | ....................... | G09G 5/393 345/581 |
| 7,532,253 B1 * | 5/2009 | Greenberg | ............... | H04N 5/45 348/563 |
| 7,825,989 B1 * | 11/2010 | Greenberg | ............... | H04N 5/45 348/563 |
| 2002/0181936 A1 * | 12/2002 | Yuen | .................. | H04N 5/44591 386/241 |
| 2004/0128700 A1 * | 7/2004 | Pan | .................... | H04N 21/4782 725/136 |
| 2005/0001934 A1 * | 1/2005 | Hwang | .............. | H04N 21/4316 348/569 |
| 2005/0044570 A1 * | 2/2005 | Poslinski | ......... | H04N 21/44016 725/48 |
| 2005/0060660 A1 * | 3/2005 | Song | ................ | H04N 21/42692 715/781 |
| 2005/0155086 A1 * | 7/2005 | Schick | ............... | H04N 1/00161 725/153 |
| 2006/0044741 A1 * | 3/2006 | Bussan | .................... | H04N 5/45 361/679.26 |
| 2007/0250896 A1 * | 10/2007 | Parker | .................... | H04N 7/163 725/135 |
| 2008/0060002 A1 * | 3/2008 | Noll | .................... | H04N 21/2402 725/35 |
| 2008/0231545 A1 * | 9/2008 | Gong | ..................... | H04N 19/44 345/1.1 |
| 2009/0125812 A1 * | 5/2009 | Blinnikka | ........... | G06F 16/4393 715/716 |
| 2009/0222757 A1 * | 9/2009 | Gupta | .............. | H04N 21/42646 715/776 |
| 2010/0271377 A1 * | 10/2010 | Low | ........................ | G09G 3/344 345/531 |
| 2011/0109808 A1 * | 5/2011 | Li | ..................... | H04N 21/23439 348/725 |
| 2011/0191813 A1 * | 8/2011 | Rozhavsky | .............. | H04N 5/45 725/110 |
| 2012/0081515 A1 * | 4/2012 | Jang | ..................... | H04N 13/361 348/43 |
| 2012/0246592 A1 | 9/2012 | Yeung | | |
| 2013/0174179 A1 * | 7/2013 | Park | ................... | G06F 3/0483 718/107 |
| 2014/0009681 A1 * | 1/2014 | Seo | .................... | H04N 21/4316 348/565 |
| 2014/0184471 A1 * | 7/2014 | Martynov | .............. | G06F 1/1637 345/1.2 |
| 2014/0325339 A1 * | 10/2014 | Gao | ................... | G06F 16/9574 715/234 |
| 2016/0037207 A1 * | 2/2016 | Soto | ........................ | G06F 3/017 725/43 |
| 2016/0231881 A1 * | 8/2016 | Sirpal | .................... | G06F 3/0482 |
| 2017/0332036 A1 * | 11/2017 | Panchaksharaiah | ........................ | H04N 21/4312 |
| 2019/0354384 A1 * | 11/2019 | Huang | .................... | G06F 9/451 |

FOREIGN PATENT DOCUMENTS

| | | |
|---|---|---|
| CN | 104850345 A | 8/2015 |
| CN | 106354372 A | 1/2017 |
| CN | 107809676 A | 3/2018 |
| CN | 109521926 A | 3/2019 |
| CN | 109561334 A | 4/2019 |

* cited by examiner

APPLICATION LAUNCHING METHOD AND DISPLAY DEVICE

CROSS REFERENCE TO RELATED APPLICATIONS

This patent application is a continuation application of International Application No. PCT/CN2019/115225 filed on Nov. 4, 2019, which claims priorities to Chinese Patent Application No. 201811434034.6 filed on Nov. 28, 2018 and Chinese Patent Application No. 201811435449.5 filed on Nov. 28, 2018, the entire contents of which are incorporated herein by reference.

TECHNICAL FIELD

The present disclosure relates to smart TV technology, and in particular to a method for launching an application and a display device.

BACKGROUND

Currently, a smart TV is installed with a large number of applications to meet various requirements of users.

Figure 1A:
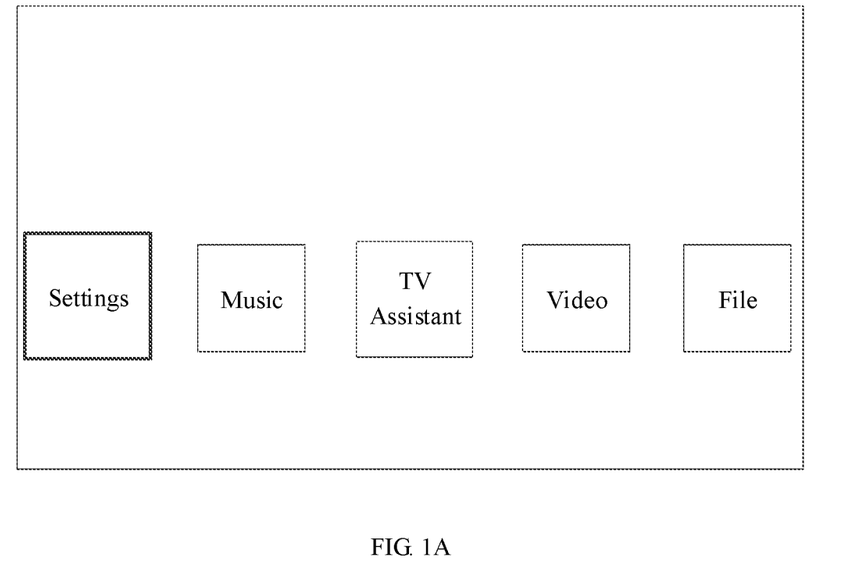
FIG. 1A is a schematic diagram illustrating a human-machine interaction interface of an application launching method according to some approaches.

However, when a user starts an application on an interface through a remote control, the application is launched slowly. For example, as shown in FIG. 1A, the smart TV displays various icons for a plurality of applications on a display screen. When the user starts an application called TV assistant, he/she first presses a direction key on the remote control, and the smart TV, after receiving an instruction associated with the direction key, controls the direction key to move to an icon corresponding to the TV assistant application on the interface. Then he/she presses a confirmation/OK key on the remote control, and the smart TV, after receiving a confirmation/OK key instruction, controls to launch the TV assistant application. Thereafter, especially when the TV assistant application is currently in a cold-start (i.e., first launch) state, the launch time is relatively long, so that the user may view a display interface of the TV assistant application shown in FIG. 1E on the display screen after waiting for a period of time. This will undoubtedly make the user feel that the application is launched slowly.

SUMMARY

In a first aspect of the present disclosure, a method for launching an application of a display device is provided, which includes: displaying a first user interface on a display screen of the display device, the first user interface comprising at least one icon for an application; determining whether a hold duration of a focus on a target icon exceeds a preset time period, the target icon being an icon of a target application; in response to the hold duration exceeding the preset time period, updating the first user interface by a second user interface, the second user interface comprising a display window superimposed on the first user interface, the display window presenting a display interface of the target application; detecting whether an activation instruction for the target icon is received; and in response to the activation instruction, updating the second user interface by a third user interface, the third user interface being a display interface displaying the target application in a full-screen mode on the display screen.

In a second aspect of the present disclosure, a display device is provided, which includes: a display screen configured to display an image; a memory configured to store computer instructions and image data associated with the display screen; and a processor configured to execute the computer instructions to perform: displaying a first user interface on the display screen, wherein the first user interface comprises at least one icon for an application; determining whether a hold duration of a focus on a target icon exceeds a preset time period, the target icon being an icon of a target application; in response to the hold duration exceeding the preset time period, updating the first user interface by a second user interface, the second user interface comprising a display window superimposed on the first user interface, the display window presenting a display interface of the target application; detecting whether an activation instruction for the target icon is received; and in response to the activation instruction, updating the second user interface by a third user interface, the third user interface being a display interface displaying the target application in a full-screen mode on the display screen.

A third aspect of the present disclosure, a non-transitory computer-readable storage medium including computer instructions stored thereon is provided, wherein the computer instructions cause a processor to execute: displaying a first user interface on a display screen of the display device, where the first user interface comprises at least one icon for an application; determining whether a hold duration of a focus on a target icon exceeds a preset time period, where the target icon is an icon of a target application; in response to the hold duration exceeding the preset time period, updating the first user interface by a second user interface which includes a display window superimposed on the first user interface, where the display window presents a display interface of the target application; detecting whether an activation instruction for the target icon is received; and in response to the received activation instruction, updating the second user interface by a third user interface, where the third user interface is a display interface displaying the target application in a full-screen mode on the display screen.

BRIEF DESCRIPTION OF THE DRAWINGS

In order to explain the embodiments of the present disclosure more clearly, the drawings to be referenced in the description of the examples will be briefly described below. It is obvious that the drawings in the following description are some embodiments of the present disclosure. Those skilled in the art may also obtain other drawings based on these drawings without involving inventive work.

DETAILED DESCRIPTION OF THE EXAMPLES

Hereinafter, taking a remote control to control a smart TV as an example, the embodiments of the present disclosure are described with reference to the accompanying drawings in the embodiments of the present disclosure. It is obvious that the described examples are only a part but not all of embodiments of the present disclosure. All other examples obtained by a person of ordinary skill in the art based on the embodiments of the present disclosure without involving inventive work fall within the protection scope of the present disclosure.

A human-machine interaction process of an application launching method according to some embodiments of the present disclosure is described in detail below with reference to FIGS. 1A-1F.

In FIG. 1A, icons of five applications including settings, music, TV assistant, video, and file are displayed in a current operation interface on a smart TV display screen, and a focus stays at an icon of the settings application by default.

Figure 1B:
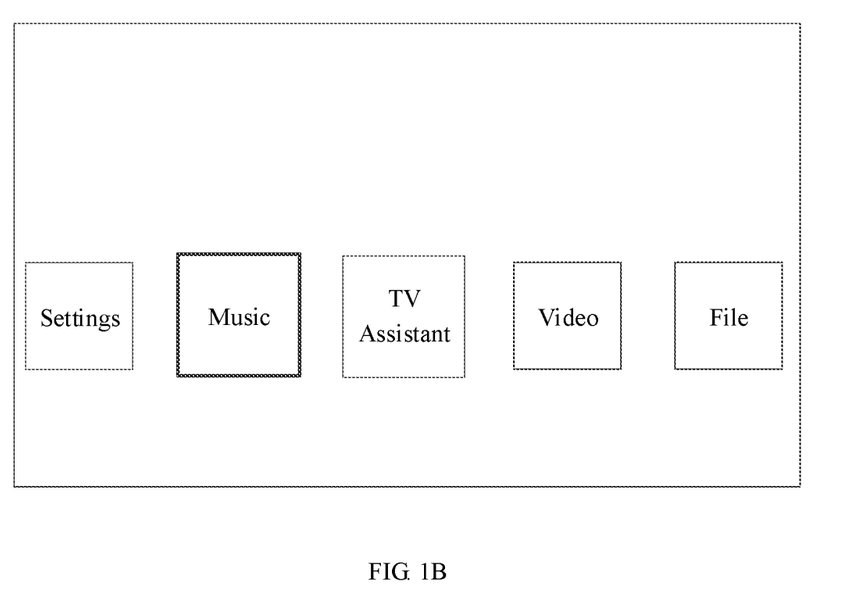
FIG. 1B is a schematic diagram illustrating a human-machine interaction interface of an application launching method according to some embodiments of the present disclosure.

In FIG. 1B, when a user presses a right directional key on the remote control, the smart TV, after receiving an instruction associated with the right directional key to move to the right, controls the focus to move from the icon of the settings application to an icon of the music application.

Figure 1C:
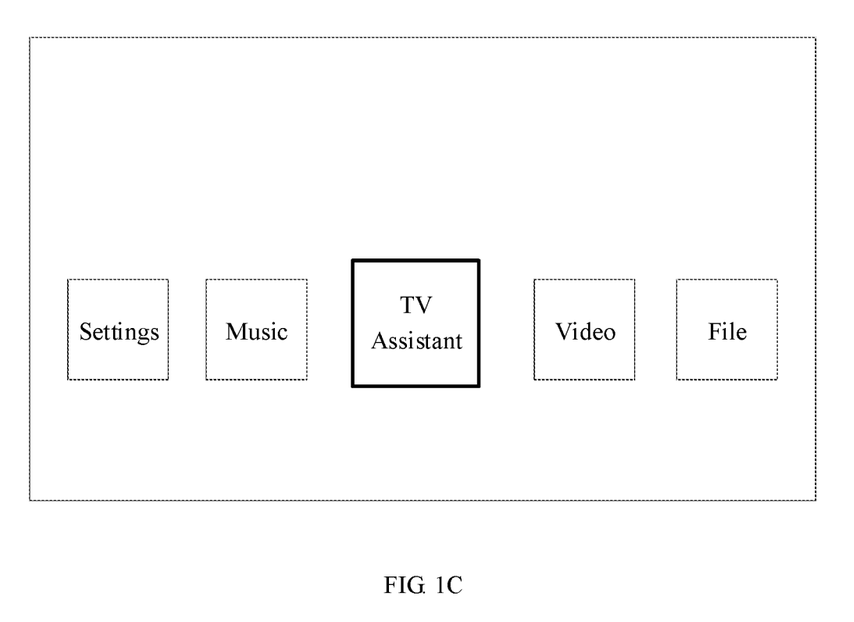
FIG. 1C is a schematic diagram illustrating a human-machine interaction interface of an application launching method according to some embodiments of the present disclosure.

In FIG. 1C, when the user continues pressing the right directional key on the remote control, the smart TV, after receiving an instruction associated with the right directional key to move the focus right, controls the focus to move from the icon of the music application to an icon of the TV assistant application.

With further reference to FIG. 1C, if the smart TV determines that a hold time of the focus on the icon of the TV assistant application exceeds a certain period. Then, in FIG. 1D, the focus is maintained to dwell on the icon of the TV assistant application. Here, a small window is displayed in an upper right corner of the current user interface, and the small window displays an entry interface after the TV assistant application is launched. The entry interface displays four option icons including memory speedup, cleaner, security check, and application management. In this way, the user may view the display interface of the application in advance, and avoid the interruption of an operation performed by the user on the current operation interface.

Figure 1D:
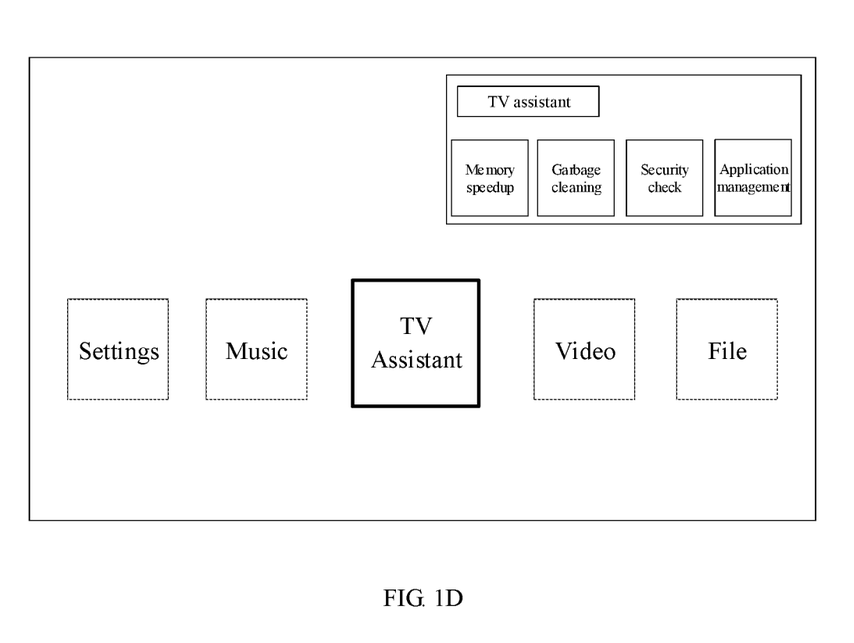
FIG. 1D is a schematic diagram illustrating a human-machine interaction interface of an application launching method according to some embodiments of the present disclosure.

The display layout of the entry interface at the small window after the TV assistant application is launched is consistent with that in a full-screen display mode so as to prevent that the user views an incomplete entry interface displayed in the small window.

Figure 1E:
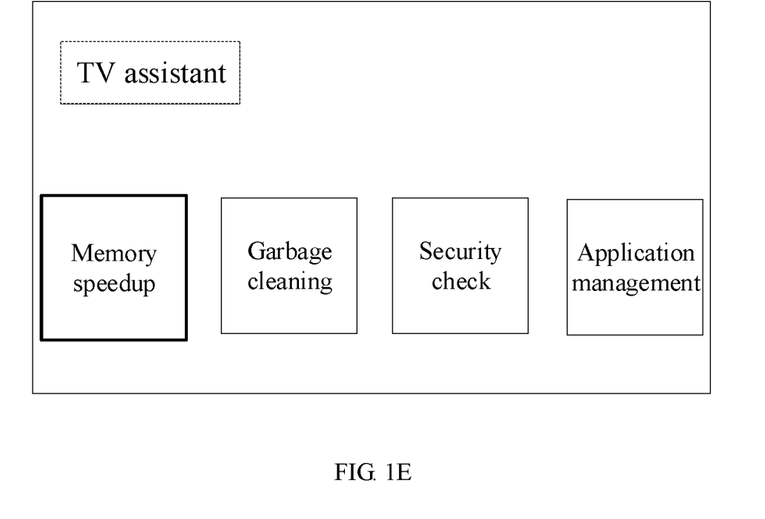
FIG. 1E is a schematic diagram illustrating a human-machine interaction interface of an application launching method according to some approaches.

Next, in FIG. 1E, when the user presses a confirmation/OK key on the remote control, the smart TV, after receiving a confirmation instruction to launch the TV assistant application selected by the focus, uses a full-screen mode to display the entry interface displayed in the small window in FIG. 1D after the TV assistant application is launched. Here, the small window in FIG. 1D is no longer displayed, and the focus defaults to stay at an icon of the memory speedup option displayed in the entry interface. In this way, since the entry interface corresponding to the TV assistant application has been launched and displayed in the small window in advance, the entry interface may be directly displayed in the full-screen mode, which undoubtedly makes the launching of the application speed up in the user's sense.

Figure 1F:
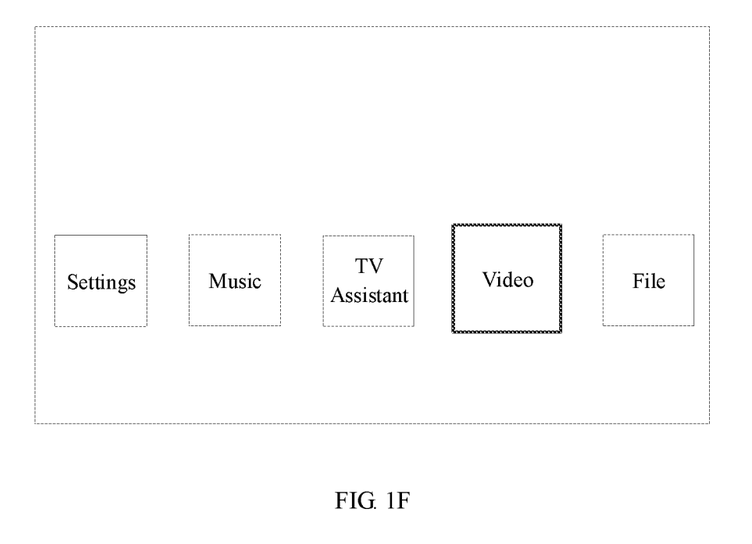
FIG. 1F is a schematic diagram illustrating a human-machine interaction interface of an application launching method according to some embodiments of the present disclosure.

However, in the interface shown in FIG. 1C, if it is determined that the hold time of the focus on the icon of the TV assistant application does not exceed a certain time period, the smart TV may perform other operations. In one implementation, the hold time may refer to a hold time duration, or a hold duration; and the time period may be a time duration within a range between 50 millisecond (ms) and 1000 ms, inclusive. For example but not limited to, the time period may be preset at 200 ms, 300 ms, or 500 ms. For example, if the user presses the right directional key on the remote control, the smart TV, after receiving an instruction associated with the right directional key to move to the right, as shown in FIG. 1F, controls the focus to move from the icon of the TV assistant application to an icon of the video application. For another example, if the user presses a left directional key on the remote control, the smart TV, after receiving an instruction associated with the left directional key to move the focus left, as shown in FIG. 1B, controls the focus to move from the icon of the TV assistant application to the icon of the music application.

Now, the description of the interface adjustment process shown in FIGS. 1A-1F is completed.

In some embodiments of the present disclosure, considering that the user, before confirming to start an application on a current operation interface, usually holds on the application for 200-500 ms. When a hold time on the application icon is exceeded, the application is launched. Further, when the smart TV determines to launch the application, since an interface corresponding to the application has been displayed in a small window, the interface corresponding to the application in the small window is directly displayed in a full-screen mode. Thereby, the application may be launched silently, such that launching of the application is speeded up significantly in the user's sense, and user experience is effectively improved.

The procedure of an application launching method according to some embodiments of the present disclosure is described in detail below with reference to FIGS. 2A-2B.

In some examples, a method for launching an application of a display device is provided. The method includes: displaying a first user interface on a display screen of the display device, where the first user interface comprises at least one icon for an application; determining whether a hold time of a focus on a target icon exceeds a preset time period, where the target icon is an icon of a target application; in response to the hold time exceeding the preset time period, updating the first user interface by a second user interface, where the second user interface comprises a display window superimposed on the first user interface, and the display window presents a display interface of the target application; detecting whether an activation instruction for the target icon is received or not; and in response to the activation instruction, updating the second user interface by a third user interface, where the third user interface is a display interface displaying the target application in a full-screen mode on the display screen.

In some implementations, the display interface of the target application runs in a Picture in Picture (PIP) mode.

In some embodiments of the present disclosure, for an application with a long focus hold time in current operation interface, the application is launched in the PIP mode in advance. The smart TV, when it is determined to take further actions on the application, may directly move a display interface corresponding to the application that has been launched in the PIP mode to an application stack where the current operation interface is located for display. In this way, it is possible to make the user not only know the interface style and content of the application in advance but also feel that the launching of the application is speeded up significantly.

In some embodiments of the present disclosure, an operation system of the smart TV allows the application stack and the PIP stack to be launched in a background. An operation interface and the display interface corresponding to the application in a full-screen state are launched through the application stack, and the application in the PIP mode is launched in the PIP stack corresponding to the application.

Figure 2A:
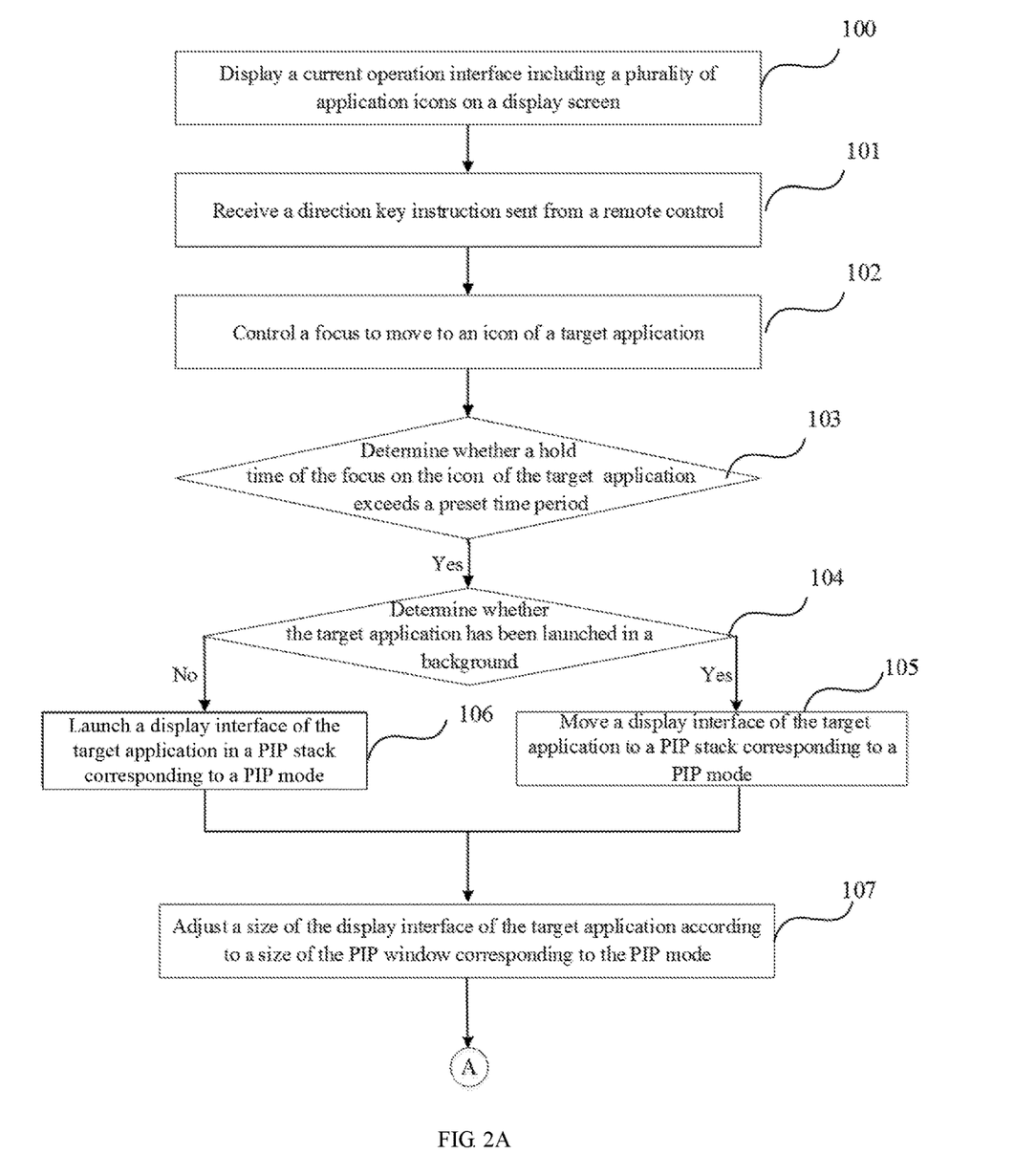
FIG. 2A is a flowchart illustrating an application launching method according to some embodiments of the present disclosure.
Figure 2B:
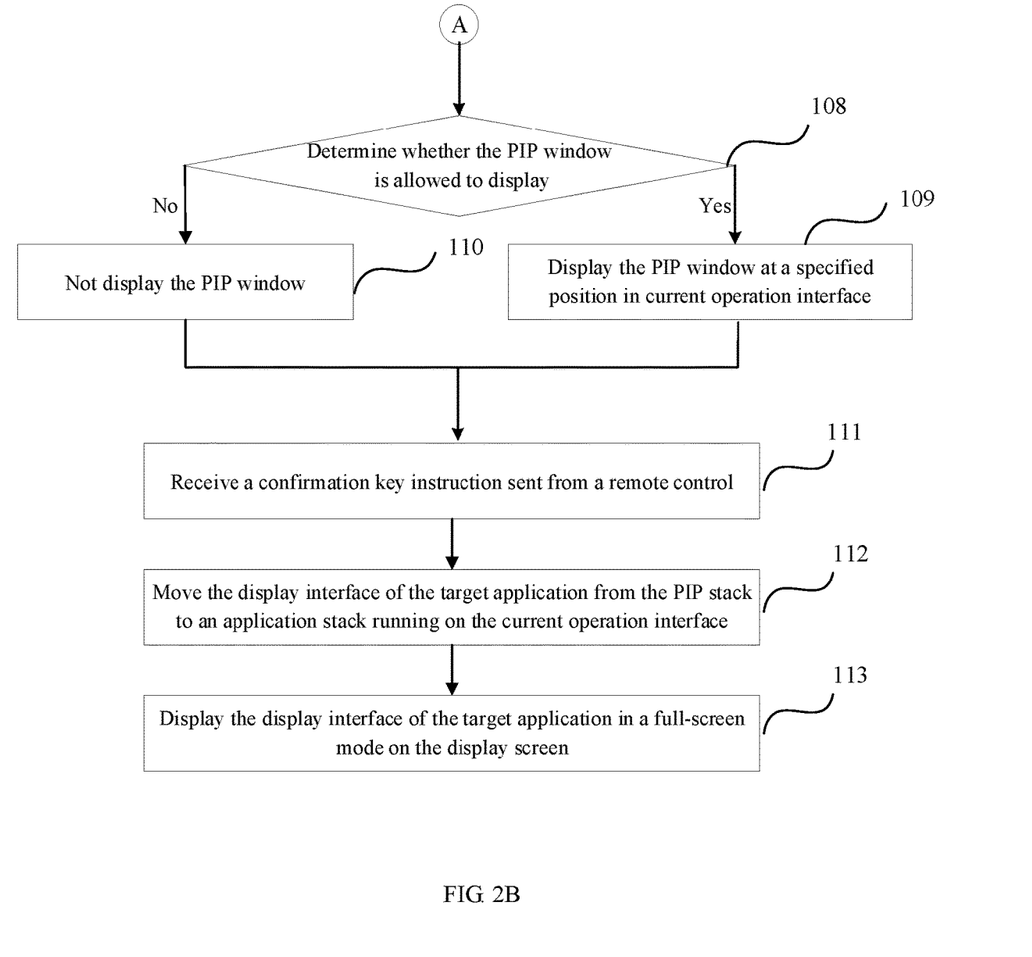
FIG. 2B is a flowchart illustrating an application launching method according to some embodiments of the present disclosure.

As shown in FIGS. 2A-2B, the application launching method includes steps 100-113.

At step 100, a display screen displays a current operation interface including a plurality of application icons.

For example, in FIG. 1A, the focus stays on the icon of the settings application in the current operation interface.

At step 101, an instruction sent from a direction key of a remote control is received.

At step 102, the focus is controlled to move to an icon of a target application.

For example, in FIG. 1C, the focus moves to the icon of the TV assistant application.

At step 103, it is determined whether a hold time of the focus on the icon of the target application exceeds a preset time period. If the hold time of the focus on the icon of the target application exceeds the preset time period, step 104 is performed, otherwise, the procedure terminates.

At step 104, it is determined whether the target application has been launched in a background. If the target application has been launched in the background, step 105 is performed, otherwise, step 106 is performed.

At step 105, a display interface of the target application is moved to a PIP stack corresponding to a PIP mode.

At step 106, the display interface of the target application is launched in the PIP stack corresponding to the PIP mode.

In step 104, when the hold time of the focus on the icon of the TV assistant application exceeds the preset time period, for example, 300 ms, identification information such as a package name corresponding to the application is parsed. Further, a function such as isProcessRunning( ), may be used to determine whether a process corresponding to the application has been running in the background.

If the process corresponding to the application has been running in the background, it indicates that the display interface corresponding to the application has existed in the background. When the application is launched again, only the display interface corresponding to the application that is not visible is restored from the background to a foreground. Therefore, in step 105, the display interface of the application may be directly moved from the background to the PIP stack corresponding to the PIP mode to run (please refer to the step 105). If the process corresponding to the application hasn't been running in the background, it indicates that the application needs to be launched and optimized in advance. Therefore, in step 106, the display interface of the application may begin to be launched in the PIP stack corresponding to the PIP mode.

Running the display interface of the application in the PIP stack corresponding to the PIP mode may include: firstly parsing application components of a display interface corresponding to a package name of the application, secondly creating an instance of a PIP window corresponding to the package name of the application in a PIP stack of the background. In some examples, the display interface is an entry interface (e.g., entry activity) of the application.

At step 107, a size of the display interface of the target application is adjusted according to a size of a PIP window corresponding to the PIP mode.

In step 107, the size of the PIP window is usually smaller than that of a full screen. Because the display interface corresponding to the application in the smart TV defaults to be displayed according to the display layout and size of the full screen in some approaches, the display interface corresponding to the application may not be displayed entirety in a PIP window area, which causes the existence of abnormality in the display interface corresponding to the application in the PIP window. For example, assuming that the display interface of the target application includes five display areas, only one display area may be displayed in the PIP window in some approaches.

Therefore, in the present disclosure, an area where the PIP window is hidden in current operation interface may be specified in advance, and the area may be any position in the current operation interface. Further, a size of a task in the PIP stack is modified, that is, in this task, the size of the display interface corresponding to the application is reduced to the size of the PIP window, to prevent the application from automatically changing its layout according to the size of the PIP window and ensure that the display layout in the full-screen state is still used in the PIP window.

At step 108, it is determined whether the PIP window is allowed to display. If the PIP window is allowed to display, step 109 is performed, otherwise, step 110 is performed.

At step 109, the PIP window is displayed at a specified position in current operation interface.

At step 110, the PIP window is not displayed.

In step 108, the smart TV may provide a switch control option to allow the PIP window to be visible. If it is determined that the PIP window is allowed to be displayed, the step 109 is performed, i.e., the PIP window is displayed at the specified position in the current operation interface. As shown in FIG. 1D, the user obtains the interface style and the content of the TV assistant application in advance through the PIP window displayed, and other operations performed by the user on the current operation interface is not affected. If it is determined that the PIP window is not allowed to be displayed, the step 110 is performed, i.e., the PIP window is not to display in the current operation interface.

At step 111, a confirmation instruction sent from a confirmation key of a remote control is received, the confirmation instruction instructs to launch the TV assistant application.

At step 112, the display interface of the target application is moved from the PIP stack to an application stack running on the current operation interface.

At step 113, the display interface of the target application is displayed in a full-screen mode on the display screen.

In some embodiments of the present disclosure, the display interface of the application is displayed on the display screen, for example, the display interface of the application is displayed as shown in FIG. 1E. The current operation interface always runs in the system application stack. When the confirmation instruction sent from a confirmation key of the remote control is received to launch the TV assistant application, since the launch of the application has been completed in advance in the PIP mode, the step 112 may be performed, i.e., the display interface of the application is moved directly from the PIP stack to the system application stack for display, and further the step 113 is performed, i.e., the display interface of the TV assistant application is displayed in the full-screen mode on the display screen.

Now, the process of the application launching method shown in FIGS. 2A-2B is completed.

In some embodiments of the present disclosure, for an application with a long focus hold time in current operation interface, the application may be launched in advance in the PIP mode, so that the user may smoothly preview the interface style and the content of the application and thereby decide whether to display the application in the full-screen mode for performing a next step.

Further, when it is determined that the application is displayed in the full-screen mode, the display interface corresponding to the application that has been launched in the PIP mode may be directly moved to the application stack where the current operation interface is located for display. In this way, launching of the application is speeded up significantly in the user's sense, and thereby the application is launched silently.

In addition, in some embodiments of the present disclosure, after it is determined that the application is launched in the background, the display interface of the application is presented in the foreground through the PIP window, such that the existence of abnormality in the display interface in the PIP window due to a long launch time may be avoided.

Besides, the display interface of the application may be completely displayed in the PIP window, avoiding the abnormality from being displayed in the PIP window, and therefore the user's visual experience is improved.

Figure 3:
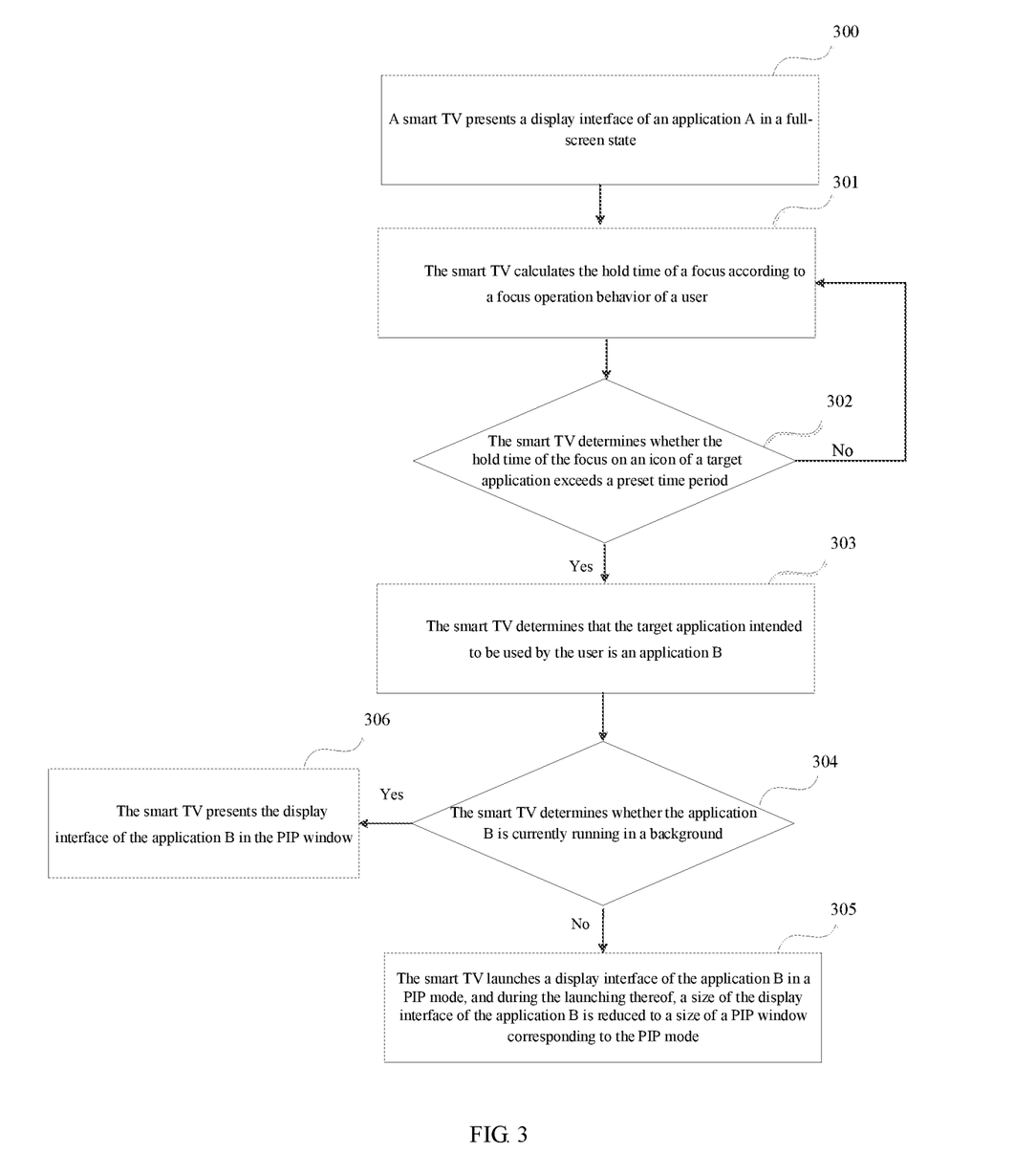
FIG. 3 is a flowchart illustrating an application launching method according to some embodiments of the present disclosure.
Figure 4:
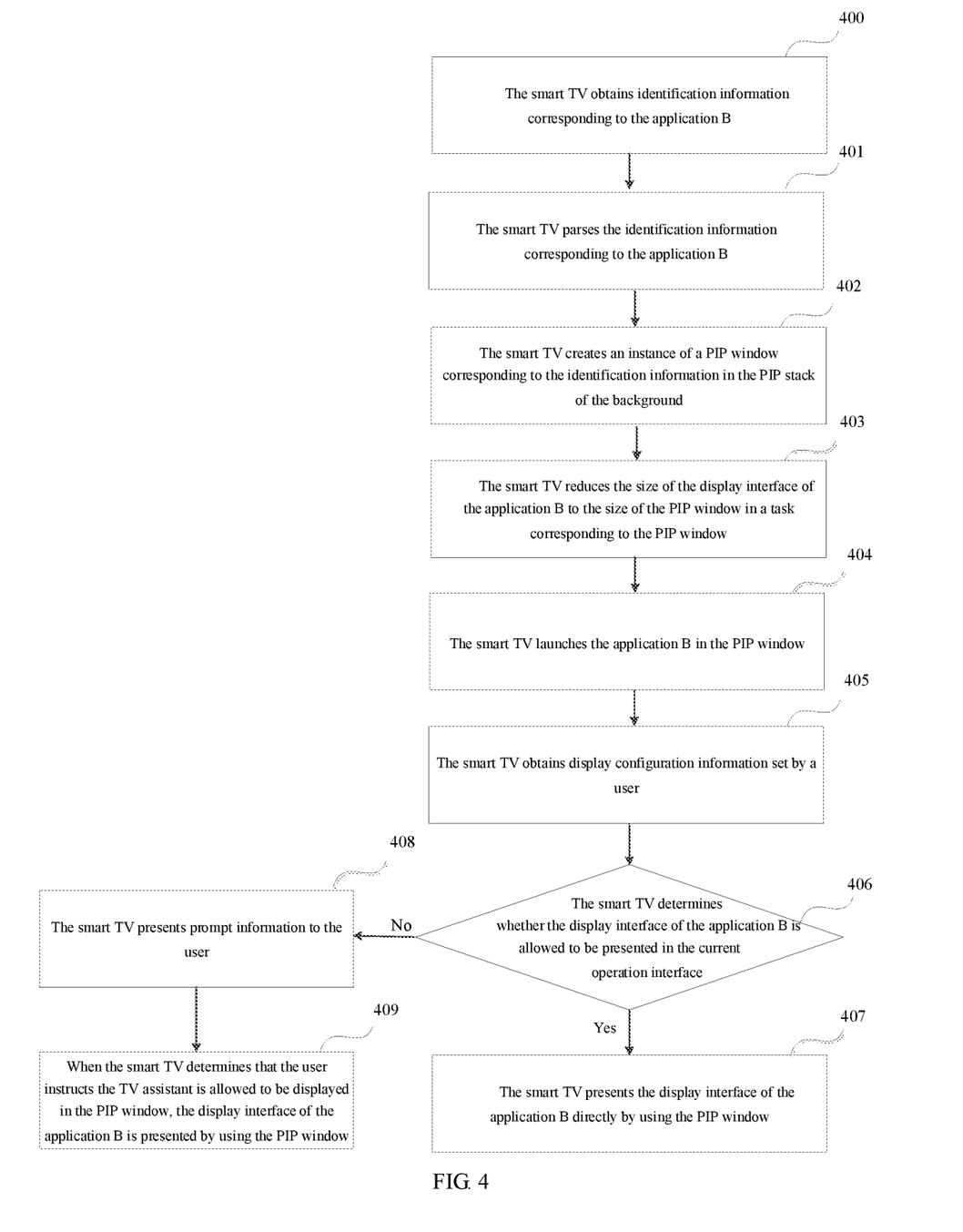
FIG. 4 is a flowchart illustrating an application launching method according to some embodiments of the present disclosure.

The procedure of another application launching method according to some embodiments of the present disclosure is described in detail below with reference to FIGS. 3 and 4. The application launching method includes steps 300-306.

At step 300, a smart TV presents a display interface of an application A in a full-screen state.

In step 300, after the smart TV is turned on, the display interface of the application A is presented in the full-screen state and serves as current main operation interface.

For example, as shown in FIGS. 1A-1C, the display interface of the application A includes icons of five applications: settings, music, TV assistant, video, and files. Also, an area of a PIP window hidden by default is specified in advance.

At step 301, the smart TV calculates a hold time of a focus according to the focus operation behavior of a user.

In step 301, the user moves a position of the focus to an icon corresponding to a to-be-started application through a remote control, and the smart TV determines the operation behavior of the user and calculates the hold time of the focus on the application.

For example, referring to FIG. 1C, when the user moves the position of the focus to the TV assistant through the remote control, the smart TV calculates the hold time of the focus corresponding to the TV assistant.

At step 302, in a currently presented operation interface, the smart TV determines whether the hold time of the focus on an icon of a target application exceeds a preset time period. If the hold time of the focus on the icon of the target application exceeds the preset time period, step 303 is performed, otherwise, step 301 is performed.

The preset time period may be set accordingly as needed. For example, the preset time period may be 200-500 ms.

At step 303, the smart TV determines that the target application intended to be used by the user is an application B.

Specifically, in some embodiments, when the smart TV determines that the hold time of the focus reaches the preset time period, an application corresponding to the icon where the position of the focus is located is determined as the target application intended to be used by the user, that is, the target application intended to be used by the user is determined as the application B.

For example, referring to FIG. 1C, the smart TV sets the preset time period to 500 ms, and when it is determined that the hold time of the focus on the icon of the TV assistant exceeds 500 ms, the TV assistant is determined as the application B.

At step 304, the smart TV determines whether the application B is currently running in a background. If the application B is currently running in the background, step 306 is performed, otherwise, step 305 is performed.

In step 304, the smart TV, when launching the application B, determine whether the application B is currently running in the background, and processes accordingly based on a determination result. The two cases will be introduced below respectively.

In a first case, it is determined that the application B has been currently running in the background.

If the application B has been currently running in the background, it indicates that the smart TV has performed a cold start (i.e., first launch) on the application B. At this time, the smart TV only needs to switch the application B from the background to a PIP stack for re-display through the PIP window.

If the first case occurs, the smart TV will process correspondingly in accordance with step 306.

In a second case, it is determined that the application B is not currently running in the background.

If the application B is not currently running in the background, it indicates that the application B has never been launched. As a result, the smart TV needs to perform the cold start on the application B.

If the second case occurs, the smart TV will process correspondingly in accordance with step 305.

At step 305, the smart TV launches a display interface of the application B in a PIP mode, and during the launch, a size of the display interface of the application B is reduced to a size of a PIP window corresponding to the PIP mode.

In step 305, the smart TV creates the PIP window in the background, and launches the display interface of the application B in the PIP stack. During the launch of the display interface of the application B, the size of the display interface of the application B is reduced according to the size of the PIP window in a task corresponding to the PIP window. Further, corresponding to the PIP window, the display interface of the application B is launched according to the size of the PIP window corresponding to the PIP stack, so that the layout of the display interface of the application B presents the same effect in both the PIP window and the full-screen state, and the display interface of the application B may be completely displayed in the PIP window.

For example, when the application B is launched for the first time, if the PIP window has a length of 2 cm and a width of 1 cm, and the display interface of the TV assistant has a length of 8 cm and a width of 7 cm, the size of the display interface of the application B is reduced to the size of the PIP window, and the display interface of the application B is presented with the length of 2 cm and the width of 1 cm in the PIP window.

At step 306, the smart TV presents the display interface of the application B in the PIP window.

In step 306, the smart TV, when it is determined that the application B is currently running in the background, records the display window currently associated with the application B in the PIP stack of the background, and adjusts the attributes of the display window according to the PIP window. According to the adjusted attributes of the display window of the application B, the display interface of the application B is presented in the PIP window, so that the layout of the display interface of the application B presents the same effect in both the PIP window and the full-screen state, and the display interface of the application B may be completely displayed in the PIP window.

For example, assuming that the application B is the TV assistant, the smart TV, when it is determined that the TV assistant is currently running in the background, records the display window currently associated with the TV assistant in the PIP stack of the background, and adjusts the size of the display window of the TV assistant according to the attributes of the PIP window, then presents the display interface of the TV assistant in the PIP window according to the adjusted size of the display window of the TV assistant.

Further, after the smart TV presents the display interface of the application B in the PIP window, the PIP window is still running in the background, and whether the PIP window is visually presented in the display interface of the application A currently presented in the full-screen state may refer to display configuration information set by the user.

Specifically, the display configuration information set by the user is obtained, and it is determined, according to the display configuration information, whether the PIP window is allowed to be used to present the display interface of the application B in current operation interface. If the PIP window is allowed to be used to present the display interface of the application B in the current operation interface, the PIP window is directly used to present the display interface of the application B. If the PIP window is not allowed to be used to present the display interface of the application B in the current operation interface, the PIP window is maintained in the background, that is, the PIP window is not presented in the current operation interface; or prompt information is presented to the user, and when it is determined that the user instructs to allow displaying the display interface of the application B, the PIP window is used to present the display interface of the application B.

For example, the smart TV obtains the display configuration information set by the user for the TV assistant. The display configuration information includes: a package name of the TV assistant application and a PIP display mode of the display window. According to the PIP display mode, the smart TV determines whether the PIP window is allowed to be used to present the display interface of the TV assistant in the current operation interface.

If the PIP window is allowed to be used to present the display interface of the TV assistant in the current operation interface, the PIP window is displayed directly in the current operation interface, and the display interface of the TV assistant is presented by using the PIP window. Referring to FIG. 1D, in the current operation interface, the smart TV displays the PIP window in an upper right corner, and presents the display interface of the TV assistant in the PIP window. The display interface of the TV assistant includes icons of four applications, such as memory speedup, cleaner, security check, and application management.

If the PIP window is not allowed to be used to present the display interface of the TV assistant in the current operation interface, the smart TV does not display the PIP window in the current operation interface, that is, the smart TV makes the current operation interface stay in a state shown in FIG. 1C; or, the smart TV presents, to the user, the prompt information, i.e., whether the TV assistant is allowed to be displayed in the PIP window, as shown in FIG. f, and when it is determined that the user instructs to allow displaying the display interface of the TV assistant, the smart TV displays the PIP window in the current operation interface, and presents the display interface of the TV assistant by using the PIP window, as shown in FIG. 1D, and details thereof are not described herein again.

Further, if receiving a launching instruction, for example, clicking the "confirmation" key on the remote control, input by the user for the application B where the focus stays, the smart TV moves the display interface of the application B from the PIP stack to the application stack so that the display interface of the application B is presented in the full-screen mode in the current operation interface, as shown in FIG. 1E.

In some embodiments of the present disclosure, referring to FIG. 1D, the smart TV may use the step 305 to create the PIP window of the application B. The specific process includes steps 400-409.

At step 400, the smart TV obtains identification information corresponding to the application B.

In step 400, the smart TV, when it is determined that the hold time of the focus on the icon of the application B exceeds the preset time period, obtains and parses the identification information corresponding to the application B.

For example, referring to FIG. 1D, if the application B is the TV assistant, the smart TV, when it is determined that the hold time of the focus on the icon of the TV assistant exceeds the preset time period, obtains the identification information corresponding to the TV assistant. The identification information includes at least a package name of the TV assistant application, and may further include an initial size, a running state, and a creation date of the display interface.

At step 401, the smart TV parses the identification information corresponding to the application B.

For example, the smart TV parses the identification information corresponding to the TV assistant, obtains at least the package name of the TV assistant application, and further, may obtain the initial size and the creation date of the display interface.

At step 402, the smart TV creates an instance of a PIP window corresponding to the identification information in the PIP stack of the background.

That is, in the PIP stack, an activity is created corresponding to the identification information. For example, an entry interface (entry activity) corresponding to the TV assistant is created in the PIP stack of the background.

At step 403, the smart TV reduces the size of the display interface of the application B to the size of the PIP window in the task corresponding to the PIP window.

For example, assuming that the display interface of the TV assistant has an initial length of 10 cm and an initial width of 9 cm, and the PIP window has a length of 3 cm and a width of 2 cm, the size of the display interface of the TV assistant is reduced to be 3 cm long and 2 cm wide.

At step 404, the smart TV launches the application B in the PIP window.

In step 404, the display interface of the application B is adjusted according to the size of the PIP window, and the TV assistant is launched according to the adjusted size of display interface, for example, according to the size of 3 cm in length and 2 cm in width.

At step 405, the smart TV obtains the display configuration information set by the user.

For example, the smart TV obtains the display configuration information set by the user for the TV assistant. The display configuration information includes: a package name of the TV assistant application and a PIP display mode of the display window.

At step 406, the smart TV determines whether the display interface of the application B is allowed to be presented in the current operation interface. If the display interface of the application B is allowed to be presented in the current operation interface, step 407 is performed; otherwise, step 408 is performed.

In step 406, the smart TV determines whether the display interface of the application B is allowed to be presented in the current operation interface according to the obtained display configuration information set by the user, and performs corresponding step according to the determination result.

For example, the smart TV determines whether the display interface of the TV assistant is allowed to be presented in the current operation interface according to the PIP display mode of the display window in the display configuration information.

At step 407, the smart TV presents the display interface of the application B directly by using the PIP window.

In step 407, the smart TV determines that the display interface of the application B is allowed to be presented in the current operation interface according to the display configuration information. In other words, the display interface of the application B is presented directly by using the PIP window.

For example, according to the PIP display mode of the display window in the display configuration information, the smart TV determines, when the display interface of the TV assistant is allowed to be presented in the current operation interface, the PIP window is displayed directly in the current operation interface, and the display interface of the TV assistant is presented by using the PIP window. Referring to FIG. 1D, the smart TV displays the PIP window in the upper right corner of the current operation interface, and presents the display interface of the TV assistant in the PIP window. The display interface of the TV assistant includes icons of four applications, such as memory speedup, cleaner, security check, and application management.

At step 408, the smart TV presents prompt information to the user.

In step 408, according to the display configuration information, the smart TV, when it is determined the display interface of the application B is not allowed to be presented in the current operation interface, presents the prompt information to the user.

Figure 1G:
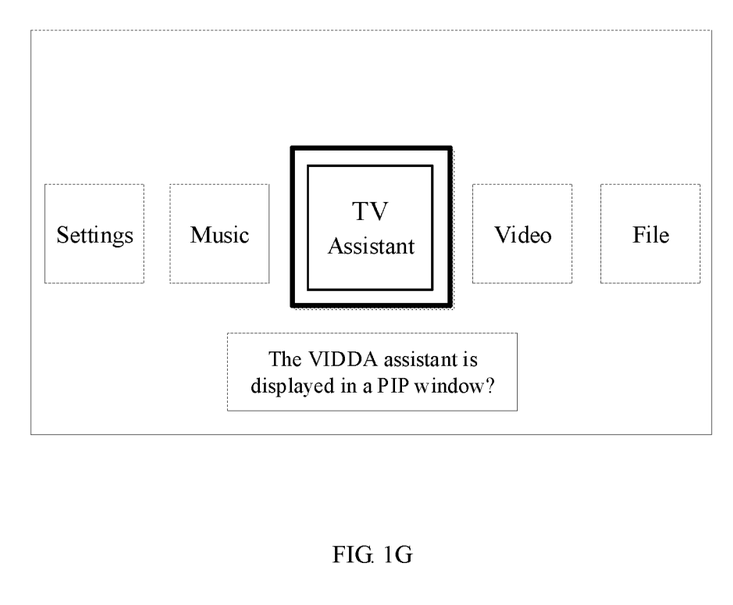
FIG. 1G is a schematic diagram illustrating a human-machine interaction interface of an application launching method according to some embodiments of the present disclosure.

For example, as shown in FIG. 1G, the smart TV presents the prompt information to the user, i.e., asks the user whether to display the TV assistant in the PIP window.

At step 409, when the smart TV determines that the user instructs the TV assistant is allowed to be displayed in the PIP window, the display interface of the application B is presented by using the PIP window.

Figure 5:
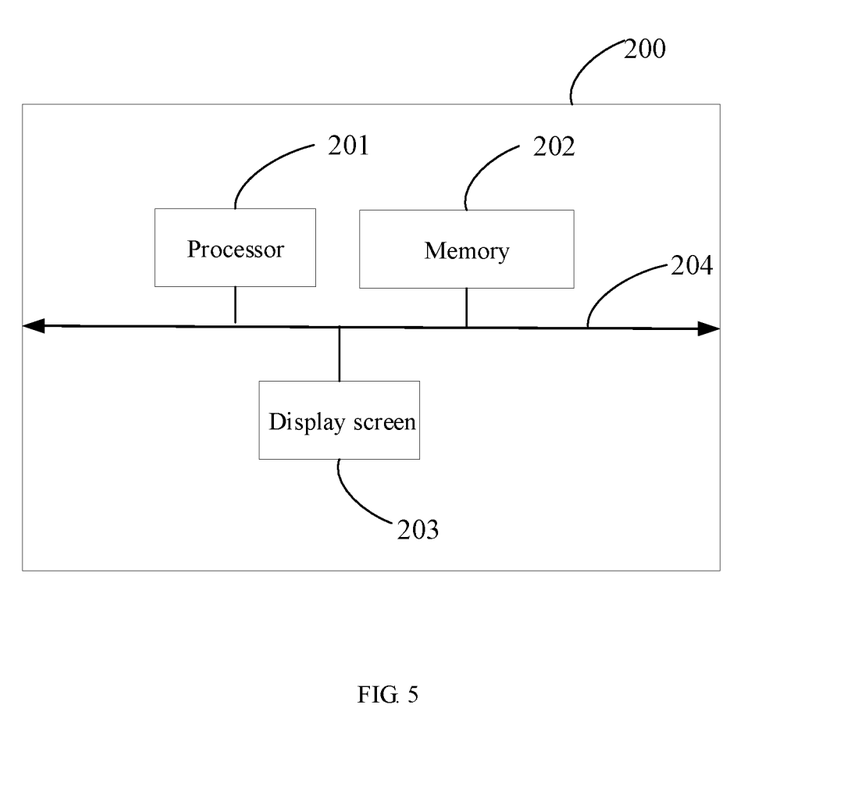
FIG. 5 is a schematic structural diagram illustrating a display device according to some embodiments of the present disclosure.

As shown in FIG. 5, a display device 200 such as a smart TV is provided according to some embodiments of the present disclosure. The display device 200 includes a processor 201, a memory 202, a display screen 203, and a bus 204.

The processor 201, the memory 202, and the display screen 203 are connected with each other through the bus 204. The bus 204 may be a peripheral component interconnect (PCI) bus or an extended industry standard architecture (EISA) bus or the like. The bus may be divided into an address bus, a data bus, a control bus, and so on. For ease of representation, the bus is indicated only with one heavy line, but it does not mean there is only a bus or a type of bus.

The processor 201 may be a general-purpose Central Processing Unit (CPU), a microprocessor, an Application-Specific Integrated Circuit (ASIC), or one or more integrated circuits for controlling programs in solutions of the present disclosure to be implemented.

The memory 202 may be a Read-Only Memory (ROM) or other type of static storage devices that may store static information and instructions, a Random Access Memory (RAM) or other type of dynamic storage devices that may store information and instructions, and may also be an Electrically Erasable Programmable Read-Only Memory (EEPROM), a Compact Disc Read-Only Memory (CD-ROM) or other optical disk storage, optical disc storage including compact discs, laser discs, optical discs, digital versatile discs, blue-ray discs, etc., magnetic disk storage media or other magnetic storage devices, or any other medium that is capable of carrying or storing desired program codes in the form of instructions or data structures and may be stored by a computer, but is not limited thereto. The memory may exist independently and be connected with the processor via the bus. The memory may also be integrated with the processor.

The memory 202 is configured to store application codes or instructions for executing the application launching method as described above, which are controlled and executed by the processor 201 to implement the application launching method, and the display screen 203 displays a human-machine interaction interface of the application launching method shown in FIGS. 1A-1G.

In some embodiments, the processor 201 executes the application codes or instructions to perform: displaying a first user interface on a display screen of the display device, where the first user interface comprises at least one icon for an application; determining whether a hold time of a focus on a target icon exceeds a preset time period, where the target icon is an icon of a target application; in response to the hold time exceeding the preset time period, updating the first user interface by a second user interface that comprises a display window superimposed on the first user interface, where the display window presents a display interface of the target application; detecting whether an activation instruction for the target icon is received; and in response to the activation instruction, updating the second user interface by a third user interface, where the third user interface is a display interface displaying the target application in a full-screen mode on the display screen.

In some implementations, the display interface of the target application runs in a PIP mode.

In some implementations, the processor 201 executes the application codes or instructions to perform: determining whether the target application runs in a background of the display device; and in response to the target application not running in the background of the display device, launching the display interface of the target application in a PIP stack corresponding to the PIP mode.

In some implementations, the processor 201 executes the application codes or instructions to perform: in response to the target application running in the background of the display device, moving the display interface of the target application to the PIP stack corresponding to the PIP mode for running.

In some implementations, a size of the display interface of the target application presented in the display window is reduced to a size of a PIP window corresponding to the PIP mode so that a display interface of the target application is completely displayed in the PIP window.

In some implementations, the processor 201 executes the application codes or instructions to perform: while the display interface of the application running in the PIP mode, reducing the size of the display interface of the application to the size of the PIP window corresponding to the PIP mode.

In some implementations, the processor 201 executes the application codes or instructions to perform: obtaining identification information of the target application, and parsing the identification information; and creating an instance of a PIP window corresponding to the identifier information in the PIP stack, and in a task corresponding to the PIP window, adjusting a size of the display interface of the target application according to a size of the PIP window.

In some implementations, the second user interface runs in an application stack.

In some implementations, the processor 201 updates the second user interface by the third user interface by: moving the display interface of the target application from the PIP stack to the application stack; running the display interface of the target application in the application stack, and displaying the display interface of the target application in the full-screen mode on the display screen.

In some embodiments of the present disclosure, a non-transitory computer-readable storage medium including computer instructions stored thereon is provided. When the computer instructions are invoked and executed by a processor of a display device to cause the processor to execute: displaying a first user interface on a display screen of the display device, where the first user interface comprises at least one icon for an application; determining whether a hold time of a focus on a target icon exceeds a preset time period, where the target icon is an icon of a target application; in response to the hold time exceeding the preset time period, updating the first user interface by a second user interface which comprises a display window superimposed on the first user interface, where the display window presents a display interface of the target application; detecting whether an activation instruction for the target icon is received; and in response to the activation instruction, updating the second user interface by a third user interface which is a display interface displaying the target application in a full-screen mode on the display screen.

Although some embodiments of the present disclosure have been described, those skilled in the art may make additional changes and modifications to these examples once they are aware of the basic inventive concept. Therefore, the appended claims are intended to be interpreted to include the preferred examples and all changes and modifications that fall within the scope of the present disclosure.

It is apparent that those skilled in the art can make various modifications and variations to the embodiments of the present disclosure without departing from the spirit and scope of the embodiments of the present disclosure. Thus, if these modifications and variations made to these embodiments of the present disclosure fall within the scope of the claims of the present disclosure and their equivalence, the present disclosure intends to cover these modifications and variations made to the embodiments of the present disclosure.

The invention claimed is:

1. A method for launching an application of a display device, comprising:
    displaying, by the display device comprising a memory storing instructions and a processor in communication with the memory, a first user interface on a display screen of the display device, the first user interface comprising at least one icon for the application;
    determining, by the display device, whether a hold duration of a focus on a target icon exceeds a preset time period, the target icon being an icon of a target application;
    in response to determining that the hold duration exceeds the preset time period, updating, by the display device, the first user interface by a second user interface that comprises a display window superimposed on the first user interface, the display window presenting a complete display interface of the target application and running in a picture in picture (PIP) mode; wherein
        the display device determines whether the target application runs in a background of the display device; and
        in response to determining that the target application does not run in the background of the display device, the display device launches the display interface of the target application in a PIP stack corresponding to the PIP mode;
    determining, by the display device, whether an activation instruction for the target icon is received; and
    in response to determining that the activation instruction is received, updating, by the display device, the second user interface by a third user interface displaying the target application in a full-screen mode on the display screen.

2. The method according to claim 1, wherein a size of the display interface of the target application presented in the display window is adjusted to a size of a PIP window corresponding to the PIP mode so that the display interface of the target application is entirely displayed in the PIP window.

3. The method according to claim 1, further comprising:
    in response to determining that the target application runs in the background of the display device, moving, by the display device, the display interface of the target application to the PIP stack corresponding to the PIP mode, to run the display interface of the target application.

4. The method according to claim 3, wherein a size of the display interface of the target application presented in the display window is adjusted to a size of a PIP window corresponding to the PIP mode so that the display interface of the target application is entirely displayed in the PIP window.

5. The method according to claim 3, further comprising:
obtaining, by the display device, identification information of the target application;
parsing, by the display device, the identification information;
creating, by the display device in the PIP stack, an instance of a PIP window corresponding to the identifier information; and
adjusting, by the display device in a task corresponding to the PIP window, a size of the display interface of the target application according to a size of the PIP window.

6. The method according to claim 1, wherein the second user interface runs in an application stack.

7. The method according to claim 6, wherein updating the second user interface by the third user interface comprises:
moving, by the display device, the display interface of the target application from the PIP stack to the application stack;
running, by the display device, the display interface of the target application in the application stack; and
displaying, by the display device, the display interface of the target application in the full-screen mode on the display screen.

8. A display device comprising:
a display screen configured to display an image;
a memory configured to store computer instructions and image data associated with the display screen; and
a processor in communication with the memory, wherein, when executing the computer instructions, the processor is configured to cause the display device to perform:
displaying, on the display screen, a first user interface comprising at least one icon for an application,
determining whether a hold duration of a focus on a target icon exceeds a preset time period, the target icon being an icon of a target application,
in response to determining that the hold duration exceeds the preset time period, updating the first user interface by a second user interface that comprises a display window superimposed on the first user interface, the display window presenting a complete display interface of the target application, and running in a picture in picture (PIP) mode; wherein
the processor determines whether the target application runs in a background of the display device; and
in response to determining that the target application does not run in the background of the display device, the processor launches the display interface of the target application in a PIP stack corresponding to the PIP mode;
determining whether an activation instruction for the target icon is received, and
in response to determining that the activation instruction is received, updating the second user interface by a third user interface displaying the target application in a full-screen mode on the display screen.

9. The display device according to claim 8, wherein a size of the display interface of the target application presented in the display window is adjusted to a size of a PIP window corresponding to the PIP mode so that the display interface of the target application is entirely displayed in the PIP window.

10. The display device according to claim 8, wherein, when executing the computer instructions, the processor is further configured to cause the display device to perform:

in response to determining that the target application runs in the background of the display device, moving the display interface of the target application to the PIP stack corresponding to the PIP mode, to run the display interface of the target application.

11. The display device according to claim 10, wherein a size of the display interface of the target application presented in the display window is adjusted to a size of a PIP window corresponding to the PIP mode so that the display interface of the target application is entirely displayed in the PIP window.

12. The display device according to claim 10, wherein, when executing the computer instructions, the processor is further configured to cause the display device to perform:
obtaining identification information of the target application;
parsing the identification information;
creating, in the PIP stack, an instance of a PIP window corresponding to the identifier information, and
adjusting, in a task corresponding to the PIP window, a size of the display interface of the target application according to a size of the PIP window.

13. The display device according to claim 8, wherein the second user interface runs in an application stack.

14. The display device according to claim 13, wherein, when the processor is configured to cause the display device to perform updating the second user interface by the third user interface, the processor is configured to cause the display device to perform:
moving the display interface of the target application from the PIP stack to the application stack;
running, in the application stack, the display interface of the target application; and
displaying, on the display screen, the display interface of the target application in the full-screen mode.

15. A non-transitory computer-readable storage medium comprising computer instructions stored thereon, wherein, when executed by a processor, the computer instructions cause the processor to execute:
displaying, on a display screen of a display device, a first user interface comprising at least one icon for an application;
determining whether a hold duration of a focus at on target icon exceeds a preset time period, the target icon being an icon of a target application;
in response to determining that the hold duration exceeds the preset time period, updating the first user interface by a second user interface that comprises a display window superimposed on the first user interface, the display window presenting a complete display interface of the target application and running in a picture in picture (PIP) mode; wherein
it is determined whether the target application runs in a background of the display device; and
in response to determining that the target application does not run in the background of the display device, the display interface of the target application is launched in a PIP stack corresponding to the PIP mode;
determining whether an activation instruction for the target icon is received; and
in response to determining that the activation instruction is received, updating the second user interface by a third user interface displaying the target application in a full-screen mode on the display screen.

* * * * *